(«12») United States Patent
Chang et al.

(10) Patent No.: US 7,553,061 B2
(45) Date of Patent: Jun. 30, 2009

(54) SIDE TYPE BACKLIGHT MODULE

(75) Inventors: Wei-Yu Chang, Taoyuan (TW); Ju-Yi Hsieh, Taoyuan County (TW); Chih-Chun Hsiao, Kaohsiung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 11/459,358

(22) Filed: Jul. 23, 2006

(65) Prior Publication Data

US 2008/0019149 A1    Jan. 24, 2008

(51) Int. Cl.
*F21V 7/04* (2006.01)

(52) U.S. Cl. .................. 362/616; 362/235; 362/607; 362/610; 362/613; 362/615; 362/631; 385/901; 349/65; 349/68; 361/749

(58) Field of Classification Search ......... 362/606–608, 362/610, 612, 613, 615, 616, 27, 235, 511; 385/901; 349/65, 68
See application file for complete search history.

(56) References Cited

U.S. PATENT DOCUMENTS

2005/0201120 A1* 9/2005 Nesterenko et al. ......... 362/609
2006/0044831 A1* 3/2006 Yu .............................. 362/615
2006/0187675 A1* 8/2006 Tseng et al. ................. 362/615

FOREIGN PATENT DOCUMENTS

| CN | 1637523  | 7/2005  |
| CN | 1705847  | 12/2005 |
| TW | M245446  | 12/2002 |
| TW | 200510877| 9/2003  |
| TW | 200512499| 9/2003  |
| TW | M277949  | 4/2005  |

* cited by examiner

*Primary Examiner*—Sandra L. O'Shea
*Assistant Examiner*—Meghan K. Dunwiddie
(74) *Attorney, Agent, or Firm*—Jianq Chyun IP Office

(57) ABSTRACT

A side type backlight module including a first light guide plate (LGP), a plurality of second LGPs, a plurality of red point light sources, a plurality of green point light sources, and a plurality of blue point light sources is provided. The first LGP has a first light emitting surface, a bottom surface, and a first light incident surface connecting the first light exit surface and the bottom surface. The second LGPs are disposed beside the first light incident surface. Further, a plurality of red, green, and blue point light sources is respectively disposed beside the second LGPs. The lights emitted by the red point light sources, the green point light sources, and the blue point light sources are blended to be a white light by each of the second LGPs and then incident to the first light incident surface.

19 Claims, 6 Drawing Sheets

SIDE TYPE BACKLIGHT MODULE

BACKGROUND OF THE INVENTION

1. Field of Invention

The present invention relates to a backlight module. More particularly, the present invention relates to a side type backlight module.

2. Description of Related Art

In response to the increasing demand of displays, the manufacturers in the industry put great efforts in the development of displays. Among the displays, the cathode ray tube (CRT) has dominated the display market for many years due to its high display quality and mature technology. However, the rising "environmental protection" awareness is against its power consumption and radiation disadvantage, and the limited flattening capability is against the market demands of light, thin, short, small, chic, and power-saving displays. Therefore, the thin film transistor liquid crystal display (TFT-LCD), having superior properties such as high image quality, good space utilization, low power consumption, and no radiation, has become the mainstream display product of the market.

A TFT-LCD module mainly comprises a liquid crystal display panel (LCD panel) and a backlight module. The LCD panel usually comprises a thin film transistor array substrate, a color filter substrate, and a liquid crystal layer disposed between the two substrates. The backlight module is used to provide the surface light source required by the LCD panel to make the LCD module achieve a display effect. Moreover, backlight modules can be classified into side type backlight modules and direct type backlight modules. The side type backlight modules are taken as an example for illustration as follows.

FIG. 1A is a top view of the conventional side type backlight module, and FIG. 1B is a cross-sectional view of the conventional side type backlight module of FIG. 1A. Referring to FIG. 1A and FIG. 1B, the conventional side type backlight module comprises a back plate 130, a flexible printed circuit (FPC) 150, a plurality of white light emitting diodes (LED) 120, a light guide plate (LGP) 110, a reflecting plate 160, a plurality of optical films 10, and a sealant 140. The LGP 110 is disposed in the back plate 130, and the reflecting plate 160 is disposed between the LGP 110 and the back plate 130. The white light LED 120 is disposed on the FPC 150 and beside the LGP 110. Moreover, the sealant 140 is disposed on the back plate 130, and the optical film 170 is disposed between the sealant 140 and the LGP 110.

More particularly, the white light LED 120 is a point light source, and the light emitted by the white light LED 120 becomes a surface source after passing through the LGP 110. The LCD display adopting the conventional side type backlight module may cause problems such as insufficient color saturation.

In view of the above problems, an architecture of a set of red LED, blue LED, and green LED is provided to substitute the white light LED 120 of the side type backlight module.

FIG. 1C is an exploded view of the conventional side type LCD backlight module. Referring to FIG. 1C, the architecture of the side type backlight module is substantially the same as that of the backlight module of FIG. 1A and FIG. 1B, and the main difference lies in that the side type backlight module of FIG. 1C adopts a green LED 120g, a red LED 120r, and a blue LED 120b, so as to blend lights to be a white light.

However, since the lights emitted by the green LED 120g, the red LED 120r, and the blue LED 120b cannot be fully uniformly blended in the LGP, a partial color shift may occur in the LCD display adopting the side type backlight module.

SUMMARY OF THE INVENTION

Accordingly, an objective of the present invention is to provide a side type backlight module, so as to improve the color saturation.

In order to achieve the above or other objectives, the present invention provides a side type backlight module, which comprises a first LGP, a plurality of second LGPs, a plurality of red point light sources, a plurality of green point light sources, and a plurality of blue point light sources. The first LGP has a first light emitting surface, a bottom surface, and a first light incident surface connecting the first light emitting surface and the bottom surface. The second LGPs are disposed beside the first light incident surface. The red, green, and blue point light sources are respectively disposed beside the second LGPs. The lights emitted by the red point light sources, the green point light sources, and the blue point light sources are blended to be a white light by each of the second LGPs and then incident to the first light incident surface.

In an embodiment of the present invention, each of the second LGPs respectively has a second light incident surface and a second light emitting surface. The two opposite side edges of the second light incident surface are respectively connected to the two opposite side edges of the second light emitting surface. The second light emitting surface is disposed beside the first light incident surface, and the red point light sources, the green point light sources, and the blue point light sources are disposed beside the second light incident surface.

In an embodiment of the present invention, the second light incident surface is a curved surface, and the second light emitting surface is a plane.

In an embodiment of the present invention, the second light incident surface is a plane, and the second light emitting surface is a curved surface.

In an embodiment of the present invention, each of the second LGPs has a second light incident surface, a second light emitting surface, and two side surfaces, wherein the side surfaces are respectively connected between the second light incident surface and the second light emitting surface, the second light emitting surface is disposed beside the first light incident surface; and the red point light sources, the green point light sources, and the blue point light sources are disposed beside the second light incident surface.

In an embodiment of the present invention, the second light incident surface and the second light emitting surface are planes.

In an embodiment of the present invention, the angle between the second light emitting surface and the side surface is in a range of 120 to 150 degree.

In an embodiment of the present invention, each of the second LGPs has a first subsidiary light incident surface, a second subsidiary light incident surface, a third subsidiary light incident surface, and a second light emitting surface. The first subsidiary light incident surface is opposite to the second light emitting surface, and the first subsidiary light incident surface is connected between the second subsidiary light incident surface and the third subsidiary light incident surface. The second light emitting surface is disposed beside the first light incident surface, and the red point light sources, the green point light sources, and the blue point light sources are respectively disposed beside the first subsidiary light incident surface, the second subsidiary light incident surface, and the third subsidiary light incident surface.

In an embodiment of the present invention, the first subsidiary light incident surface, the second subsidiary light incident surface, the third subsidiary light incident surface, and the second light emitting surface are planes.

In an embodiment of the present invention, the angle between the first subsidiary light incident surface and the second subsidiary light incident surface is in a range of 120 to 150 degree.

In an embodiment of the present invention, the angle between the first subsidiary light incident surface and the third subsidiary light incident surface is in a range of 120 to 150 degree.

In an embodiment of the present invention, each of the second LGPs further has two side surfaces respectively connected between the second subsidiary light incident surface and the second light emitting surface and between the third subsidiary light incident surface and the second light emitting surface.

In an embodiment of the present invention, the first subsidiary light incident surface, the second subsidiary light incident surface, the third subsidiary light incident surface, and the second light emitting surface are planes, and the side surfaces are curved surfaces.

In an embodiment of the present invention, the first subsidiary light incident surface and the second light emitting surface are planes, and the second subsidiary light incident surface and the third subsidiary light incident surface are curved surfaces.

In an embodiment of the present invention, the side type backlight module further comprises a back plate, and the first LGP is disposed thereon.

In an embodiment of the present invention, the side type backlight module further comprises a sealant disposed on the back plate and above the first LGP.

In an embodiment of the present invention, the side type backlight module further comprises an FPC, and the red point light sources, the green point light sources, the blue point light sources, and the second LGPs are disposed on the FPC.

In an embodiment of the present invention, the side type backlight module further comprises a reflecting plate disposed on the bottom surface of the first LGP.

In an embodiment of the present invention, the side type backlight module further comprises at least an optical film disposed on the first light emitting surface of the first LGP.

In an embodiment of the present invention, the first LGP and the second LGPs are integrated in one-piece.

The present invention adopts a plurality of second LGPs to blend the red, blue, and green lights in order to form the white light. Therefore, compared with the conventional art, the side type backlight module of the present invention has preferable color saturation.

In order to make the aforementioned and other objects, features and advantages of the present invention comprehensible, preferred embodiments accompanied with figures are described in detail below.

DESCRIPTION OF EMBODIMENTS

The First Embodiment

Figure 1A:
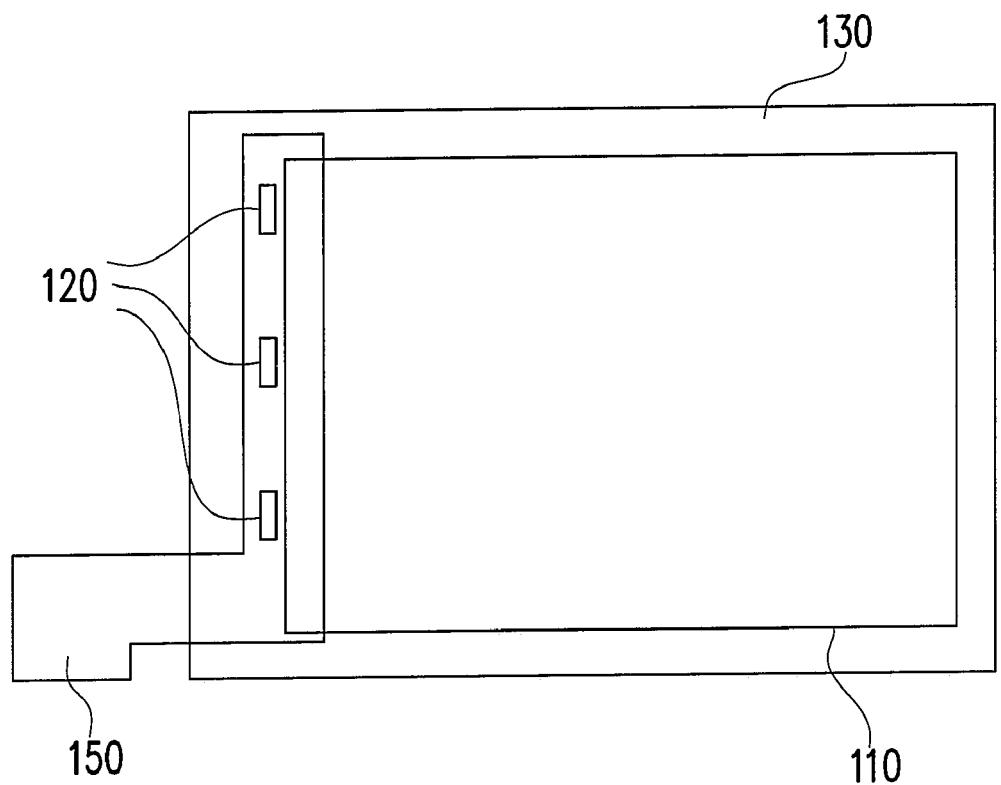
FIG. 1A is a top view of the conventional side type backlight module.
Figure 1B:
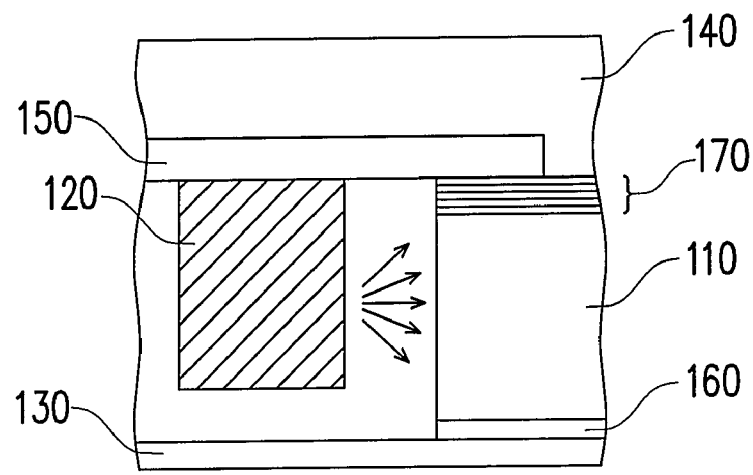
FIG. 1B is a cross-sectional view of the conventional side type backlight module of FIG. 1A.
Figure 1C:
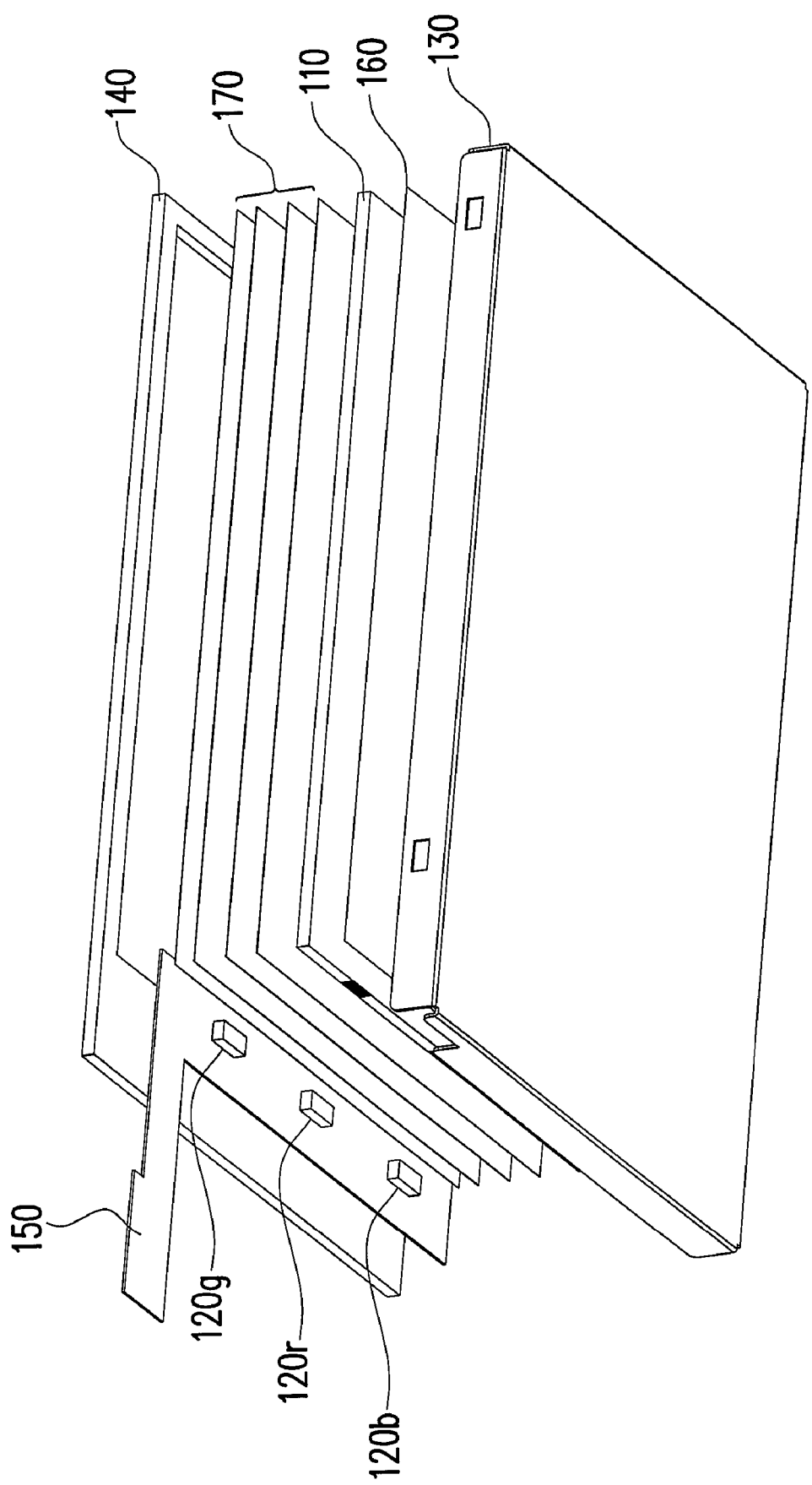
FIG. 1C is an exploded view of the conventional side type LCD backlight module.
Figure 2A:
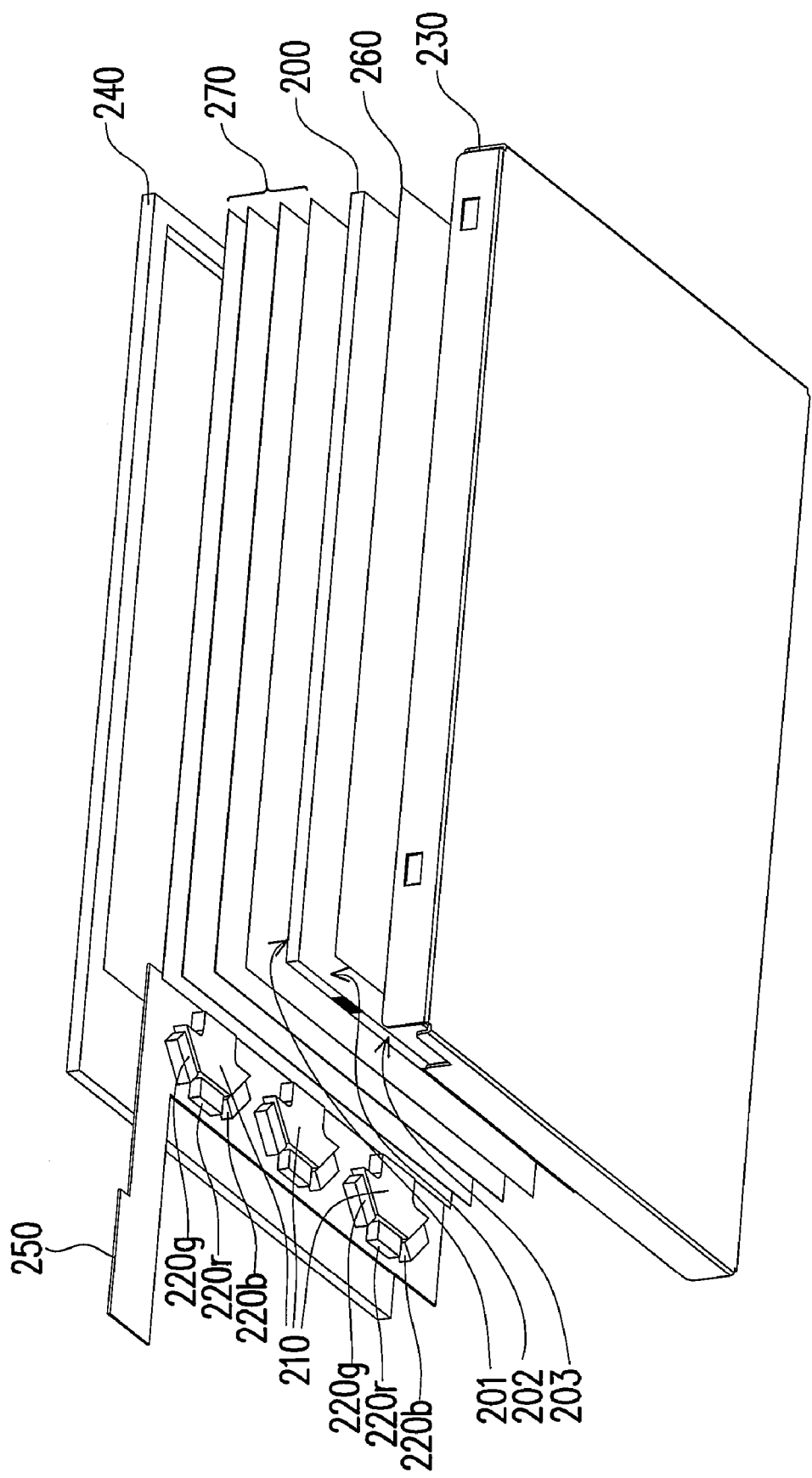
FIG. 2A is an exploded view of the side type backlight module of the first embodiment of the present invention.
Figure 2B:
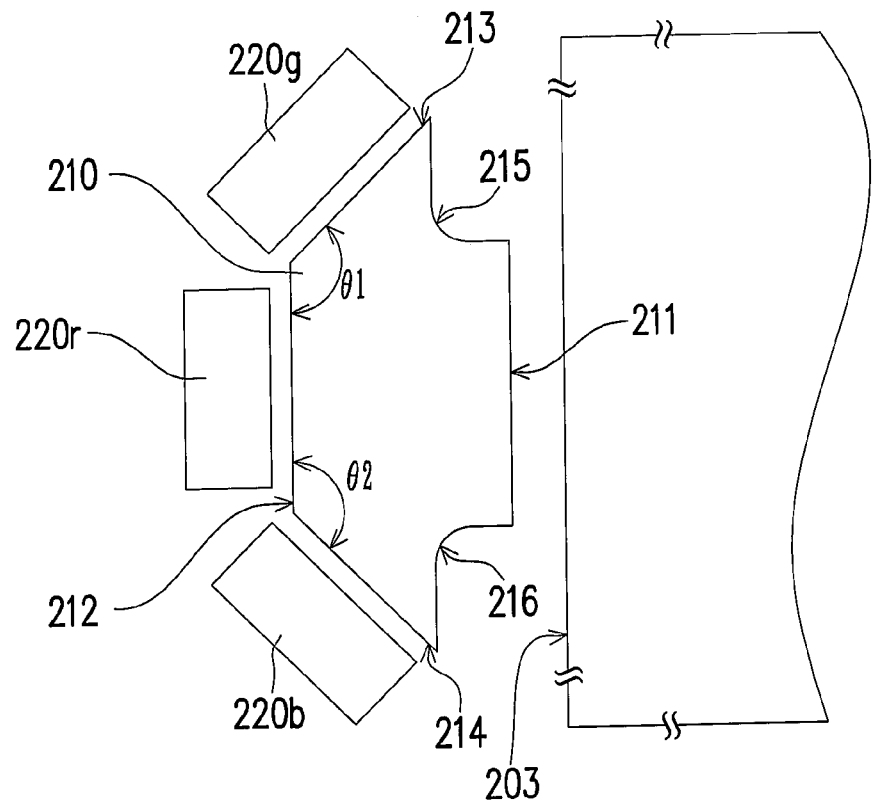
FIG. 2B is a top view of the second LGP of FIG. 2A.

FIG. 2A is an exploded view of the side type backlight module of the first embodiment of the present invention, and FIG. 2B is a top view of the second LGP of FIG. 2A. Referring to FIG. 2A and FIG. 2B, the side type backlight module of the present embodiment comprises a first LGP 200, a plurality of second LGPs 210, a plurality of red point light sources 220$r$, a plurality of blue point light sources 220$b$, and a plurality of green point light sources 220$g$. The first LGP has a first light emitting surface 201, a bottom surface 202, and a first light incident surface 203 connecting the first light emitting surface 201 and the bottom surface 202. Moreover, the second LGPs 210 are disposed beside the first light incident surface 202. The red point light sources 220$r$, blue point light sources 220$b$, and green point light sources 220$g$ are respectively disposed beside the second LGPs 210. Therefore, the lights emitted by the red point light sources 220$r$, the blue point light sources 220$b$, and the green point light sources 220$g$ are blended to be the white light by each of the second LGPs 210 and then incident to the first light incident surface 203.

More particularly, in the present embodiment, the second LGP 210 has a second light emitting surface 211, a first subsidiary light incident surface 212, a second subsidiary light incident surface 213, a third subsidiary light incident surface 214, and two side surfaces 215, 216. The first subsidiary light incident surface 212 is opposite to the second light emitting surface 211, and the first subsidiary light incident surface 212 connects the second subsidiary light incident surface 213 and the third subsidiary light incident surface 214. The two side surfaces 215, 216 are respectively connected between the second light emitting surface 211 and the second subsidiary light incident surface 213 and between the second light emitting surface 211 and the third subsidiary light incident surface 214. In the present embodiment, the two side surfaces 215, 216 are curved surfaces, and the others are planes. However, the two side surfaces 215, 216 of the present embodiment can also be planes.

Moreover, the red point light sources 220$r$, the green point light sources 220$g$, and the blue point light sources 220$b$ are respectively disposed beside the first subsidiary light incident surface 212, the second subsidiary light incident surface 213, and the third subsidiary light incident surface 214. However, the arrangement of the red point light sources 220$r$, the green point light sources 220$g$, and the blue point light sources 220$b$ is not limited to the present invention, and the details are illustrated as follows.

Referring to FIG. 2B, an angle θ1 exists between the first subsidiary light incident surface 212 and the second subsidiary light incident surface 213, and an angle θ2 exists between the first subsidiary light incident surface 212 and the third subsidiary light incident surface 214. The angle θ1 and the angle θ2 can be same or different. Moreover, the angle θ1 can be in a range of 120 to 150 degree, and the angle θ2 can also be in a range of 120 to 150 degree.

Moreover, the material of the second LGPs 210 can be polymethylmethacrylate (PMMA), polycarbonate (PC), or another transparent material. Further, the molding method of the second LGPs 210 can be cut molding or injection molding. Also, in the present embodiment, the surfaces except the first subsidiary light incident surface 212, the second subsidiary light incident surface 213, the third subsidiary light incident surface 214, and the second light emitting surface 211 are formed with a high-reflection material layer, so as to improve the light blending effect. Further, the red point light sources 220r, the green point light sources 220g, and the blue point light sources 220b can be LEDs or organic light emitting diodes (OLEDs).

Referring to FIG. 2A, the backlight module of the present embodiment further comprises a back plate 230, a sealant 240, an FPC 250, a reflecting plate 260, and at least an optical film 270. The first LGP 200 is disposed in the back plate 230. Moreover, the red point light sources 220r, the green point light sources 220g, and the blue point light sources 220b are disposed on the FPC 250, and the second LGPs 210 are disposed on the FPC 250. The reflecting plate 260 is disposed on the bottom surface 202 of the first LGP 200, and the optical film 270 is disposed on the first light emitting surface 201 of the first LGP 200. Moreover, the sealant 240 is disposed on the back plate 230 and above the first LGP 200. It should be noted that the first LGP 200 and the second LGPs 210 of the present embodiment are respectively formed, and the first LGP 200 and the second LGPs 210 can also be integrated in one-piece.

Since the present invention uses the second LGPs to blend the red light, blue light and green light to form the white light with high saturation, compared with the lo conventional art, the LCD display with the side type backlight module has preferable color saturation.

The Second Embodiment

The structure of the backlight module of the second embodiment is substantially the same as that of the backlight module of the first embodiment, while the main difference is that the structure of the second LGPs 310 is different.

Figure 3:
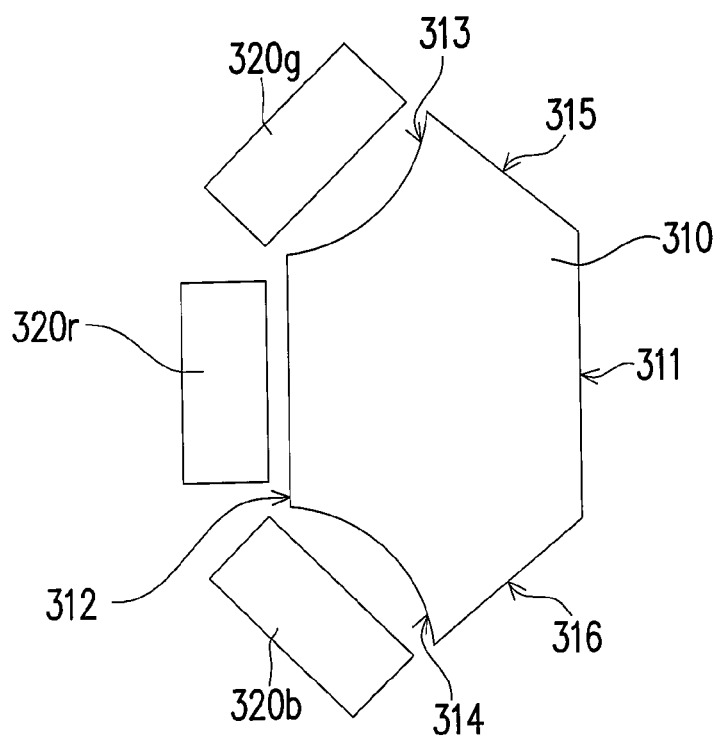
FIG. 3 is a top view of the second LGP of the second embodiment of the present invention.

FIG. 3 is a top view of the second LGP of the second embodiment of the present invention. Referring to FIG. 3, the second LGP 310 has a second light emitting surface 311, a first subsidiary light incident surface 312, a second subsidiary light incident surface 313, a third subsidiary light incident surface 314, and two side surfaces 315, 316. The first subsidiary light incident surface 312 is opposite to the second light emitting surface 311, and the first subsidiary light incident surface 312 connects the second subsidiary light incident surface 313 and the third subsidiary light incident surface 314. The side surface 315 is connected between the second light emitting surface 311 and the second subsidiary light incident surface 313, and the side surface 316 is connected between the second light emitting surface 311 and the third subsidiary light incident surface 314. Moreover, the red point light sources 320r, the green point light sources 320g, and the blue point light sources 320b are respectively disposed beside the first subsidiary light incident surface 312, the second subsidiary light incident surface 313, and the third subsidiary light incident surface 314.

In the present embodiment, the second subsidiary light incident surface 313 and the third subsidiary light incident surface 314 are curved surfaces, and the first subsidiary light incident surface 312 and the second light emitting surface 311 are planes. Moreover, the two side surfaces 315, 316 are planes. However, in other embodiments, the two side surfaces 315, 316 can also be curved surfaces.

The Third Embodiment

The structure of the backlight module of the third embodiment is substantially the same as that of the backlight module of the first embodiment, while the main difference is the different structure of the second LGPs 410.

Figure 4:
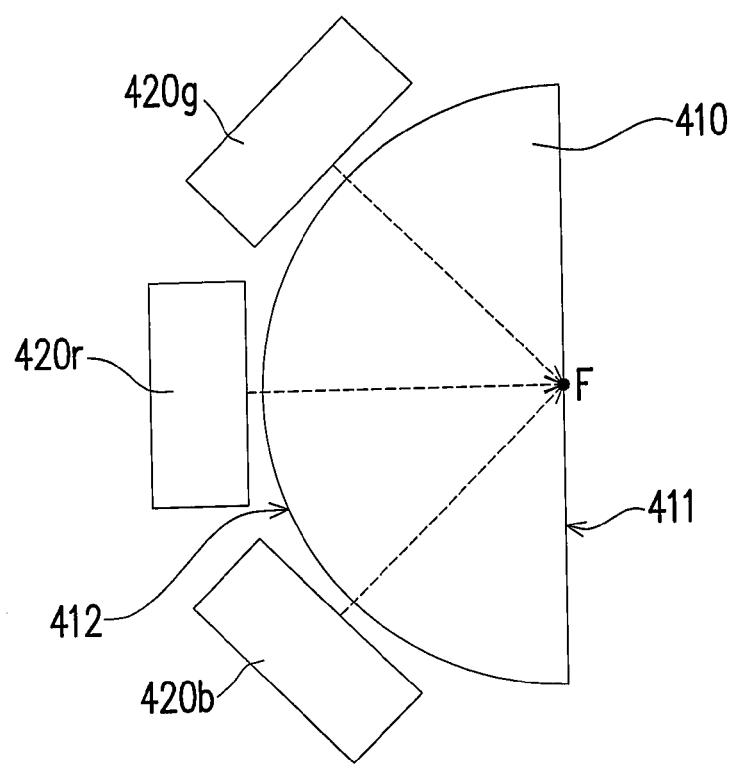
FIG. 4 is a top view of the second LGP of the third embodiment of the present invention.

FIG. 4 is a top view of the second LGP of the third embodiment of the present invention. Referring to FIG. 4, the second LGP 410 of the present embodiment has a second light emitting surface 411 and a second light incident surface 412. The second light incident surface 412 is a curved surface, and the second light emitting surface 411 can be a plane. However, the second light emitting surface 411 can also be a convex surface or a concave surface with a curvature different from that of the second light incident surface 412. Moreover, the red point light sources 420r, the green point light sources 420g, and the blue point light sources 420b are disposed beside the second light incident surface 412.

More particularly, the curvature of the second light incident surface 412 can be designed to make the lights emitted by the red point light sources 420r, the green point light sources 420g, and the blue point light sources 420b focused on the focus F of the second light emitting surface 411 after passing through the second LGP 410.

The Fourth Embodiment

The structure of the backlight module of the fourth embodiment is substantially the same as that of the backlight module of the first embodiment, while the main difference is the different structure of the second LGPs 510.

Figure 5:
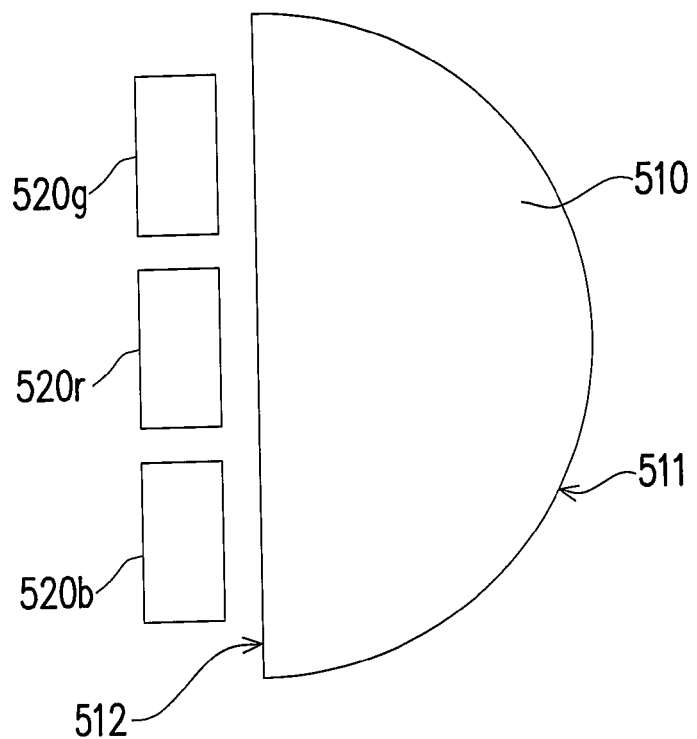
FIG. 5 is a top view of the second LGP of the fourth embodiment of the present invention.

FIG. 5 is a top view of the second LGP of the fourth embodiment of the present invention. Referring to FIG. 5, the second LGP 510 of the present embodiment has a second light emitting surface 511 and a second light incident surface 512. The second light emitting surface 511 is a curved surface, and the second light incident surface 512 can be a plane. However, the second light incident surface 512 can also be a convex surface or a concave surface with a curvature different from that of the second light emitting surface 511. Moreover, the red point light sources 520r, the green point light sources 520g, and the blue point light sources 520b are disposed beside the second light incident surface 512.

The Fifth Embodiment

The structure of the backlight module of the fifth embodiment is substantially the same as that of the backlight module of the first embodiment, while the main difference is the different structure of the second LGPs 610.

Figure 6:
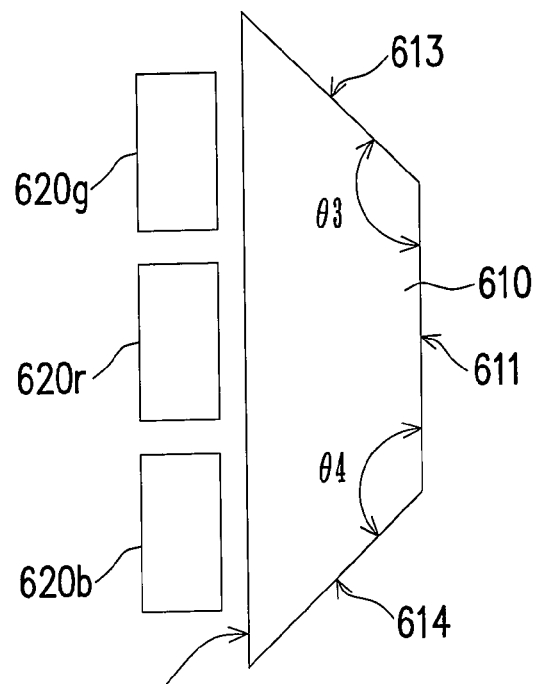
FIG. 6 is a top view of the second LGP of the fifth embodiment of the present invention.

FIG. 6 is a top view of the second LGP of the fifth embodiment of the present invention. Referring to FIG. 6, the second LGP 610 has a second light emitting surface 611, a second light incident surface 612, and two side surfaces 613, 614. In the present embodiment, the second light emitting surface 611, the second light incident surface 612, and the two side surfaces 613, 614 are planes. However, the second light emitting surface 611, the second light incident surface 612, and the two side surfaces 613, 614 are curved surfaces. Moreover, the red point light sources 620r, the blue point light sources 620b, and the green point light sources 620g are disposed beside the second light incident surface 612.

Moreover, the angle between the second light emitting surface 611 and the side surface 613 is θ3, and the angle between the second light emitting surface 611 and the side surface 614 is θ4. Moreover, the angle θ3 and the angle θ4 can be the same or different. Moreover, the angle θ3 can be in a range of 120 to 150 degree, and the angle θ4 can also be in a range of 120 and 150 degree.

The Sixth Embodiment

The structure of the backlight module of the sixth embodiment is substantially the same as that of the backlight module of the first embodiment, while the main difference is the different structure of the second LGPs 710.

Figure 7:
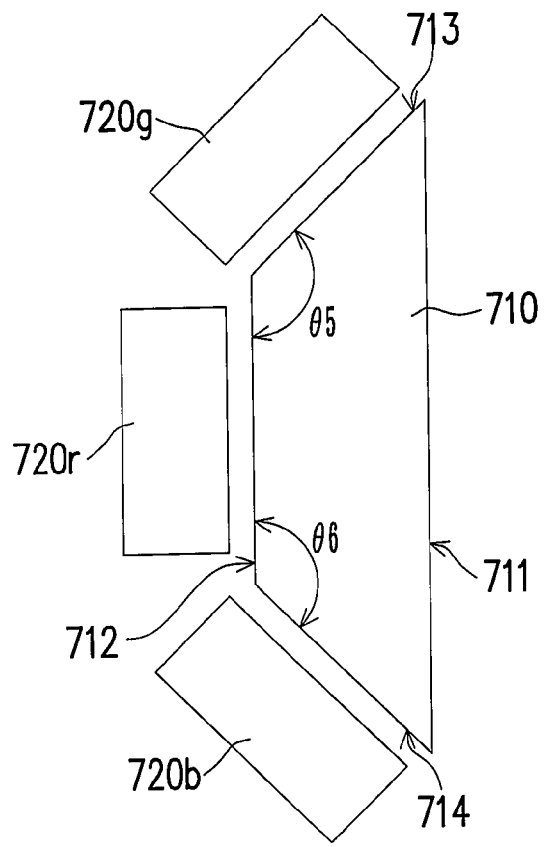
FIG. 7 is a top view of the second LGP of the sixth embodiment of the present invention.

FIG. 7 is a top view of the second LGP of the sixth embodiment of the present invention. Referring to FIG. 7, the second LGP 710 comprises a second light emitting surface 711, a first subsidiary light incident surface 712, a second subsidiary light incident surface 713, and a third subsidiary light incident surface 714. In the present embodiment, the second light emitting surface 711, the first subsidiary light incident surface 712, the second subsidiary light incident surface 713, and the third subsidiary light incident surface 714 are planes. However, the second light emitting surface 711, the first subsidiary light incident surface 712, the second subsidiary light incident surface 713, or the third subsidiary light incident surface 714 can also be a curved surface. Moreover, the red point light sources 720r are disposed beside the first subsidiary light incident surface 712, the green point light sources 720g are disposed beside the second subsidiary light incident surface 713, and the blue point light sources 720b are disposed beside the third subsidiary light incident surface 714.

Moreover, an angle θ5 exists between the first subsidiary light incident surface 712 and the second subsidiary light incident surface 713, and an angle θ6 exists between the first subsidiary light incident surface 712 and the third subsidiary light incident surface 714. The angle θ5 and the angle θ6 can be the same or different. Moreover, the angle θ5 can be in a range of 120 to 150 degree, and the angle θ6 can also be in a range of 120 to 150 degree.

To sum up, the present invention adopts a plurality of second LGPs together with the red point light sources, the blue point light sources, and the green point light sources, so as to blend lights to be the white light. Therefore, compared with the conventional art, the side type backlight module of the present invention has preferable color saturation, and can avoid the color shift. Moreover, the present invention also provides second LGPs with various different structures, which can be used to achieve the objective of uniformly blending lights to be the white light.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A side type backlight module, comprising:
 a first light guide plate (LGP) having a first light emitting surface, a bottom surface, and a first light incident surface connecting the first light emitting surface and the bottom surface;
 a plurality of second LGPs disposed beside the first light incident surface;
 a plurality of red point light sources respectively disposed beside the second LGPs;
 a plurality of green point light sources respectively disposed beside the second LGPs;
 a plurality of blue point light sources respectively disposed beside the second LGPs, wherein the lights emitted by the red point light sources, the green point light sources, and the blue point light sources are blended to be a white light by each of the second LGPs and then incident to the first light incident surface; and
 a flexible printed circuit, wherein the red point light sources, the green point light sources, the blue point light sources, and the second LGPs are disposed on the flexible printed circuit.

2. The side type backlight module as claimed in claim 1, wherein each of the second LGPs respectively has a second light incident surface and a second light emitting surface, two opposite side edges of the second light incident surface are respectively connected to two opposite side edges of the second light emitting surface, the second light emitting surface is disposed beside the first light incident surface, and the red point light sources, the green point light sources, and the blue point light sources are disposed beside the second light incident surface.

3. The side type backlight module as claimed in claim 2, wherein the second light incident surface is a curved surface and the second light emitting surface is a plane.

4. The side type backlight module as claimed in claim 2, wherein the second light incident surface is a plane and the second light emitting surface is a curved surface.

5. The side type backlight module as claimed in claim 1, wherein each of the second LGPs has a second light incident surface, a second light emitting surface, and two side surfaces, the side surfaces are respectively connected between the second light incident surface and the second light emitting surface, the second light emitting surface is disposed beside the first light incident surface, and the red point light sources, the green point light sources, and the blue point light sources are disposed beside the second light incident surface.

6. The side type backlight module as claimed in claim 5, wherein the second light incident surface and the second light emitting surface are planes.

7. The side type backlight module as claimed in claim 6, wherein the angle between the second light emitting surface and the side surface is in a range of 120 to 150 degree.

8. The side type backlight module as claimed in claim 1, wherein each of the second LGPs has a first subsidiary light incident surface, a second subsidiary light incident surface, a third subsidiary light incident surface, and a second light emitting surface, the first subsidiary light incident surface is opposite to the second light emitting surface, the first subsidiary light incident surface is connected between the second subsidiary light incident surface and the third subsidiary light incident surface, the second light emitting surface is disposed beside the first light incident surface, and the red point light sources, the green point light sources, and the blue point light sources are respectively disposed beside the first subsidiary light incident surface, the second subsidiary light incident surface, and the third subsidiary light incident surface.

9. The side type backlight module as claimed in claim 8, wherein the first subsidiary light incident surface, the second subsidiary light incident surface, the third subsidiary light incident surface, and the second light emitting surface are planes.

10. The side type backlight module as claimed in claim 8, wherein the angle between the first subsidiary light incident surface and the second subsidiary light incident surface is in a range of 120 to 150 degree.

11. The side type backlight module as claimed in claim 8, wherein the angle between the first subsidiary light incident surface and the third subsidiary light incident surface is in a range of 120 to 150 degree.

12. The side type backlight module as claimed in claim 8, wherein each of the second LGPs further has two side surfaces respectively connected between the second subsidiary light incident surface and the second light emitting surface and between the third subsidiary light incident surface and the second light emitting surface.

13. The side type backlight module as claimed in claim 12, wherein the first subsidiary light incident surface, the second subsidiary light incident surface, the third subsidiary light incident surface, and the second light emitting surface are planes, and the side surfaces are curved surfaces.

14. The side type backlight module as claimed in claim 12, wherein the first subsidiary light incident surface and the second light emitting surface are planes, and the second subsidiary light incident surface and the third subsidiary light incident surface are curved surfaces.

15. The side type backlight module as claimed in claim 1, further comprising a back plate, and the first LGP disposed thereon.

16. The side type backlight module as claimed in claim 15, further comprising a sealant disposed on the back plate and above the first LGP.

17. The side type backlight module as claimed in claim 1, further comprising a reflecting plate disposed on the bottom surface of the first LGP.

18. The side type backlight module as claimed in claim 1, further comprising at least an optical film disposed on the first light emitting surface of the first LGP.

19. The side type backlight module as claimed in claim 1, wherein the first LGP and the second LGPs are integrated in one-piece.

\* \* \* \* \*